United States Patent

[11] 3,578,854

| | | |
|---|---|---|
| [72] | Inventor | Johann Roth<br>Schwabhausen, Germany |
| [21] | Appl. No. | 767,748 |
| [22] | Filed | Oct. 15, 1968 |
| [45] | Patented | May 18, 1971 |
| [73] | Assignee | Niezoldi & Kramer G.m.b.H.<br>Munich, Germany |
| [32] | Priority | Oct. 18, 1967 |
| [33] | | Germany |
| [31] | | P 15 97 341.8 |

[54] MOTION PICTURE PROJECTOR
25 Claims, 3 Drawing Figs.

[52] U.S. Cl. .................................................... 352/158,
226/91, 226/113
[51] Int. Cl. ...................................................... B65h 17/42,
G03b 1/58
[50] Field of Search............................................ 352/158;
226/91, 113

[56] References Cited
UNITED STATES PATENTS
3,351,254  11/1967  Lustig et al. .................. 352/158X
3,352,469  11/1967  Woodhouse et al. ......... 226/91

Primary Examiner—Louis R. Prince
Assistant Examiner—Frederick Shoon
Attorney—Michael S. Striker ABSTRACT: A motion picture projector wherein the leading end of motion picture film is initially engaged by a first sprocket and thereupon advances along a first fixed loop former, through the film gate and along a second fixed loop former to move into the range of a second sprocket which advances it around a pivotable deflecting roll and into engagement with the core of a driven takeup reel so that the latter subjects the film to tension. Such tension is utilized to impart to the sprockets additional movements in directions to move the loops of film away from engagement with the loop formers. This is achieved by rotating the first sprocket counter to its normal direction of rotation and by effecting short-lasting additional rotary movement of the second sprocket in its normal direction of rotation. Such movements are superimposed upon normal movements of the sprockets in response to axial movement of two worms each of which drives one of the sprockets by way of a worm wheel, or in response to appropriate displacement of an endless belt which is trained around pulleys rigid with the sprockets.

MOTION PICTURE PROJECTOR

BACKGROUND OF THE INVENTION

The present invention relates to cinematographic apparatus in general, and more particularly to improvements in motion picture projectors. Still more particularly, the invention relates to improvements in projectors which are provided with automatic film threading and loop forming means.

It is already known to provide a motion picture projector with means for threading the film through the film channel so that the leading end of the film reaches and is automatically attached to the core of the takeup reel. It is also known to provide such projectors with means for reducing the size of the two loops which are formed by motion picture film upstream and downstream of the film gate. As a rule, the film threading means comprises a first toothed sprocket or drum which is installed upstream of the film gate and a second sprocket or drum downstream of the film gate. The two loops are formed between the gate and the drums. In order to reduce the size of loops prior to projection of images but subsequent to attachment of the leading end of film to the takeup reel, such projectors are provided with means for rotating the two drums in reverse whereby the outer sides of the loops are moved away from the loop formers to thus insure that the film does not rub against the loop formers during projection of images onto a screen. In accordance with presently prevailing practice, the drums are rotatably mounted on two shafts and receive torque by way of two couplings each of which includes a sleeve axially movably mounted on the respective shaft. Axial movements of the sleeves bring about angular displacements of the drums in opposite directions. The means for moving the sleeves axially comprises a shifting member which is pivotably mounted in the housing of the projector.

A drawback of the just outlined prior projectors is that their film threading devices are quite complicated, bulky, expensive and prone to malfunction. The drums cannot be rigidly mounted on their shafts and the shifting member must be manipulated by hand. On the other hand, a shortening of loops in response to appropriate angular displacement of drums presents a number of advantages; one of these advantages is that the conventional mobile loop formers can be dispensed with.

SUMMARY OF THE INVENTION

One of several important objects of my invention is to provide a motion picture projector wherein the drums or sprockets which flank the film gate can be controlled in a novel and improved way to form loops of requisite size prior to projection of images onto a screen.

Another object of the invention is to provide a motion picture projector with a fully automatic loop forming means which is capable of properly advancing the film on to the core of the takeup reel and which is also capable of automatically shortening the loops upstream and downstream of the film gate as soon as the leading end of the film is properly secured to the takeup reel.

A further object of the invention is to provide a motion picture projector wherein the film transporting drums can be rigidly connected to their shafts and wherein the loop forming and film threading means occupies little room.

An additional object of the invention is to provide an automatic loop forming and film threading means which comprises a relatively small number of simple parts.

The improved motion picture projector comprises guide means defining an elongated path for motion picture film and including a film gate and fixed first and second loop formers respectively located upstream and downstream of the gate, rotary first and second film transporting members respectively located upstream and downstream of the first and second loop formers to transport the film lengthwise along the path, and drive means arranged to engage first portions of and to thereby rotate the transporting members during a first stage of film transport (namely, during initial threading of motion picture film through the guide means until the leading end of the film is automatically coupled to the core of the driven takeup reel) and to engage second portions of the transporting members during a second stage of film transport whereby the transporting members receive from the drive means motion which is superimposed upon motion received during the first stage of film transport. Such superimposed motion is effective to shorten the loops formed by the loop formers during the first stage so that the loops formed upstream and downstream of the film gate are moved away from the loop formers.

In accordance with a first embodiment of my invention, each of the transporting members comprises a worm wheel and the drive means comprises a pair of preferably coaxial worms each of which meshes with one of the worm wheels. The projector then further comprises an actuating lever or analogous means for moving the worms axially with reference to the worm wheels to thereby move the worms from engagement with first into engagement with second portions of the worm wheels which results in superimposition of motion to the motion received by the worm wheels during the first stage of film transport. The actuating lever can be moved by hand or automatically in response to tensioning of film when the leading end is attached to the takeup reel.

In accordance with a second embodiment of my invention, each of the two film transporting members comprises a pulley or a gear and the drive means comprises an endless flexible element (e.g., a belt, cord, chain or toothed belt) which is trained over the pulleys and can be moved by a spring or the like between first and second positions in which the flexible element respectively engages first and second portions of the pulleys or gears to thereby superimpose upon the motion received by the transporting members during the first stage of film transport a further motion which suffices to cause a shortening of both loops.

The novel features which are considered as characteristic of the invention are set forth in particular in the appended claims. The improved motion picture projector itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
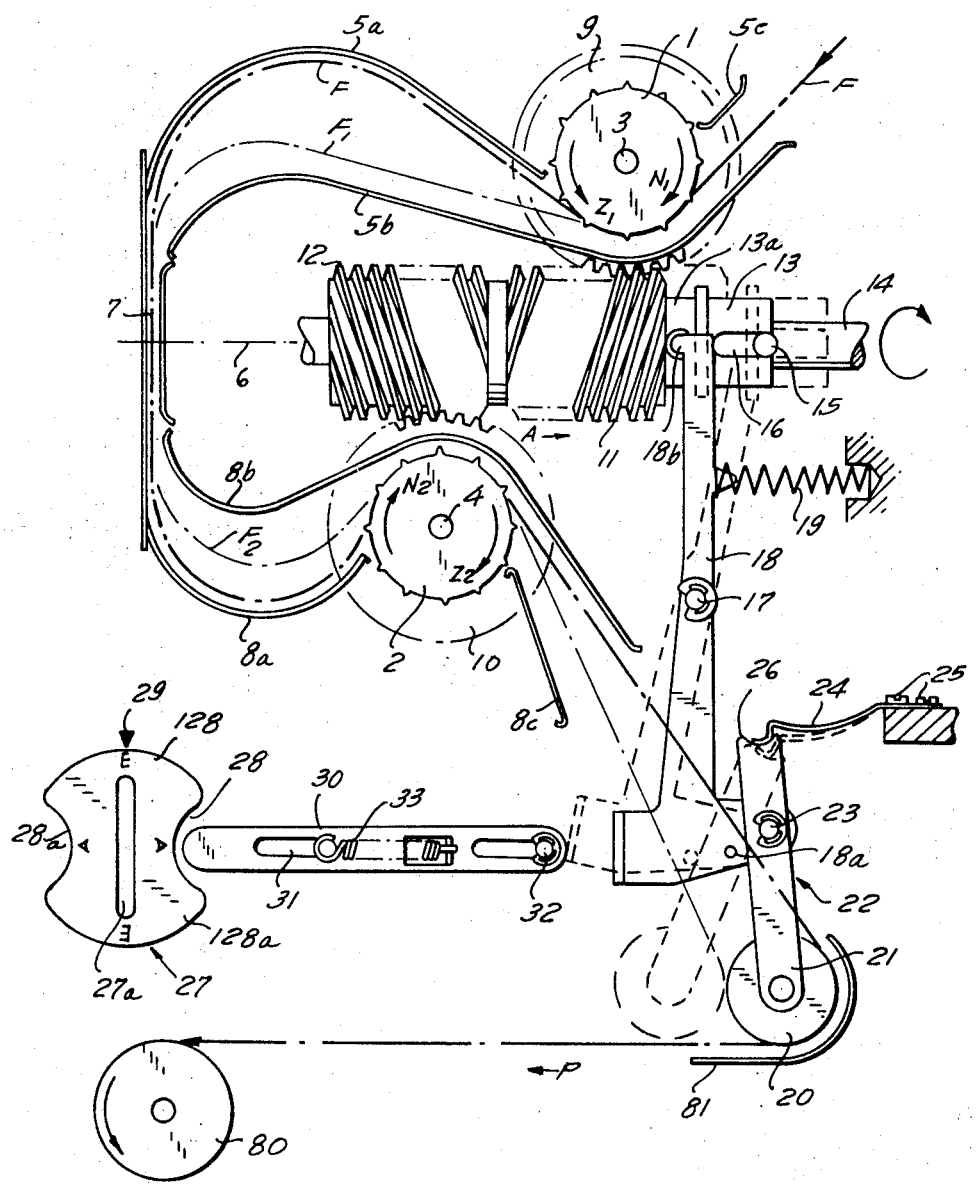
FIG. 1 is a schematic partly sectional view of a semiautomatic film threading and loop forming means for use in a motion picture projector.

FIG. 1 illustrates a portion of a motion picture projector which comprises a first toothed film transporting drum or sprocket 1 and a second film transporting drum or sprocket 2. These drums are respectively fixed to shafts 3, 4 which are rotatable in the body or housing of the projector. The teeth of the drum 1 can advance motion picture film F along a first fixed loop former 5a which is mounted in the housing of the projector upstream of a film gate 7. Successive increments of film F which are advanced by the drum 1 are caused to pass through the gate 7 and can travel along the concave side of a second loop former 8a which is installed in the housing upstream of the second drum 2. The drums 1, 2 respectively comprise worm wheels 9, 10 which mesh with worms 11, 12 provided on a hollow drive shaft 13 which surrounds the main drive shaft 14 of the projector. The worms 11, 12 are respectively provided with right-hand and left-hand threads. The shaft 13 is movable axially of the main drive shaft 14 and receives torque from a radial pin 15 of the main drive shaft.

The pin 15 is slidably received in an axially parallel slot 16 of the shaft 13. The arrangement is such that the shaft 13 can be shifted axially of the main drive shaft 14 when the latter is at a standstill or when the latter is driven by an electric motor (not shown) or another suitable prime mover.

The means for moving the shaft 13 axially of the shaft 14 comprises a two armed actuating lever 18 which is pivotable on a pin 17 of the housing and is permanently biased by a helical spring 19 which tends to maintain it in the solid-line position of FIG. 1. This is the threading position of the lever 18.

In order to automatically thread the film F through the gate 7 and to attach the leading end of the film to teeth or claws on the core of a takeup reel 80, the operator of the projector introduces the leading end of the film into a channel defined by two fixed guide members 5b, 5c. The thus introduced leading end is engaged by the teeth of the drum 1 which rotates in the direction indicated by arrow N1 so that the film moves toward and along the concave side of the loop former 5a, through the gate 7, along the concave side of the loop former 8a, into the range of teeth of the drum 2, through a second channel defined by fixed guide members 8b, 8c, and along a further guide member 81 which guides the film around a pivotable deflecting roll 20. The leading end of the film then advances in a suitable channel (not shown) and moves into the range of teeth on the core of the takeup reel 80. The teeth of the drums 1, 2 and the teeth of the core on the takeup reel 80 enter customary perforations which are provided along one or both marginal portions of the film F. The numeral 6 denotes the optical axis of the projector lens, not shown.

The deflecting roll 20 is mounted on one arm 21 of a two-armed lever 22 which is fulcrumed in the housing of the projector, as at 23, and whose other arm has a concave notch 26 engaged by the suitably deformed end portion of a detent 24 here shown as a leaf spring which is affixed to the housing by one or more screws 25. The threading position of the lever 22 is shown in FIG. 1 by solid lines.

The takeup reel 80 is driven by the motor of the projector so that it tends to rotate at a speed which exceeds the speed of the drums 1, 2. This when the leading end of the film F is engaged by and is properly coupled to the core of the reel 80, the foremost part of the film F is subjected to suddenly increasing tensional stresses acting in the direction indicated by arrow P. These stresses cause the lever 22 to pivot on the pin 23 in a clockwise direction by overcoming the resistance of the detent spring 24. The latter continues to engage the notch 26 and ultimately maintains the lever 22 in the phantom-line position of FIG. 1. The arrangement is preferably such that, while moving from the solid-line position to the phantom-line position of FIG. 1, or vice versa, the lever 22 moves through a dead center position so that the spring 24 can hold the deflecting roll 20 in each of the two illustrated positions. Thus, the free end of the spring 24 merely moves back and forth in the notch 26 but is not disengaged from the lever 22 at any time.

As the lever 22 pivots in a clockwise direction and toward the phantom-line position of FIG. 1, its arm 21 causes a follower 18a of the actuating lever 18 to pivot the actuating lever toward the phantom-line position of FIG. 1, i.e., in a clockwise direction. The upper arm of the lever 18 carries a motion transmitting pin 18b which extends into a circumferential groove 13a of the shaft 13 so that the latter is shifted in a direction to the right, as indicated by arrow A. The resulting axial position of the shaft 13 and of its worms 11, 12 is indicated by phantom lines. It will be seen that such axial displacement of the shaft 13 changes the loci of engagement between the worms 12, 13 and the corresponding worm wheels 1, 2 whereby the worm wheels receive motion in directions indicated by arrows Z1, Z2 (i.e., counter to and in their normal directions of rotation which are respectively indicated by arrows N1 and N2). Such superimposed motion is desirable in order to move the two loops of motion picture film F away from direct contact with the concave inner sides of the fixed loop formers 5a and 8a. The final positions of the two loops F1, F2 are indicated in FIG. 1 by thin phantom lines.

It will be noted that the loops F1, F2 are then held away from contact with the loop formers 5a, 8a as well as from the fixed guides 5b, 8b. While the axial displacement of the worm 11 causes the drum 1 to turn counter to its normal direction of rotation (N1) caused by the main shaft 14, axial displacement of the worm 12 causes the worm wheel 10 to superimpose upon the normal clockwise rotation (arrow N2) of the drum 2 a second clockwise rotary movement (arrow Z2) so that the loop F2 is caused to move away from the concave inner side of the loop former 8a. The shape of the loops F1, F2 remains unchanged while the film F is thereupon caused to move lengthwise and to be collected on the core of the takeup reel 80 during projection of its images onto a screen, not shown. The claw pull down which moves the film stepwise through the gate 7 is not shown in the drawing.

When the unwinding of the film F from the supply reel (not shown) is completed, i.e., when the trailing end of the film moves beyond the gate 7, drum 2 and deflecting roll 20, the operator turns a selector knob 27 through 90 degrees to return the actuating lever 18 to the solid-line position of FIG. 1. The knob 27 preferably also serves as a means for starting or arresting the motor, not shown, which drives the main shaft 14 and the reel 80. The periphery of the knob 27 is formed with two recesses 28, 28a which are located diametrically opposite each other and are separated from each other by two convex lobes 128, 128a. The knob 27 cooperates with a reciprocable slide 30 which is biased against its peripheral surface by a helical spring 33 and is formed with elongated slots 31 for guide pins 32 affixed to the housing of the projector. When the left-hand end of the slide 30 extends into one of the recesses 28, 28a, the slide is inoperative and permits the lever 18 to move between the solid-line and the phantom-line positions. By turning the knob 27 through the intermediary of a diametral rib 27a which is accessible at the outer side of the housing, the operator of the projector can shift the slide 30 to the right so that the lever 18 is returned to the solid-line position. At the same time, the knob 27 arrests the aforementioned motor so that the operator can remove the takeup reel 80 which is then replaced by an empty takeup reel and that the operator can replace the supply reel with a fresh supply reel containing a supply of convoluted film. The housing of the projector is provided with a fixed index 29 and the exposed surface of the knob 27 is formed with symbols E and A which respectively indicate that the motor is on off. Pivotal movement of the lever 18 back to the solid-line position of FIG. 1 results in axial displacement of the shaft 13 and worms 11, 12 in a direction counter to that indicated by arrow A. Thus, the projector is ready to carry out a further self-threading operation as soon as the knob 27 is again turned through 90 degrees to move one of the symbols E into registry with the index 29. The spring 33 immediately returns the slide 30 to the illustrated inoperative position; however, the lever 18 remains in the threading position because the detent 24 is strong enough to hold the lever 22 in the solid-line position of FIG. 1. Thus, the deflecting roll 20 is ready for the next threading operation which begins when the operator introduces the leading end of a fresh film into the channel between the stationary guides 5b, 5c so that the leading end moves into the range of teeth on the drum 1. The spring 19 maintains the lever 18 in the solid-line position until the tension (arrow P) produced by the revolving takeup reel 80 causes the deflecting roll 20 to move from the solid-line position to the phantom-line position of FIG. 1. Since the spring 33 holds the slide 30 in the position shown in FIG. 1, the lower arm of the lever 18 has ample room to move to the phantom-line position in response to clockwise pivotal movement of the lever 22.

The parts 5a—5c, 7, 8a—8c, 20 and 81 together constitute a composite guide means which defines an elongated path along which the leading end of motion picture film advances from the supply reel to the takeup reel 80. The parts 11, 12, 13 can be made by injection molding of suitable impact-resistant synthetic plastic material and preferably constitute a rigid one-piece unit. An important advantage of such unit is that, during normal film transport, axial forces acting upon the worms 11, 12 balance each other to thus prevent unintentional axial displacement of the shaft 13. On the other hand, such coaxial mounting of worms 11, 12 insures that axial displacement of the shaft 13 can be carried out by exertion of a very small force.

Figure 2:
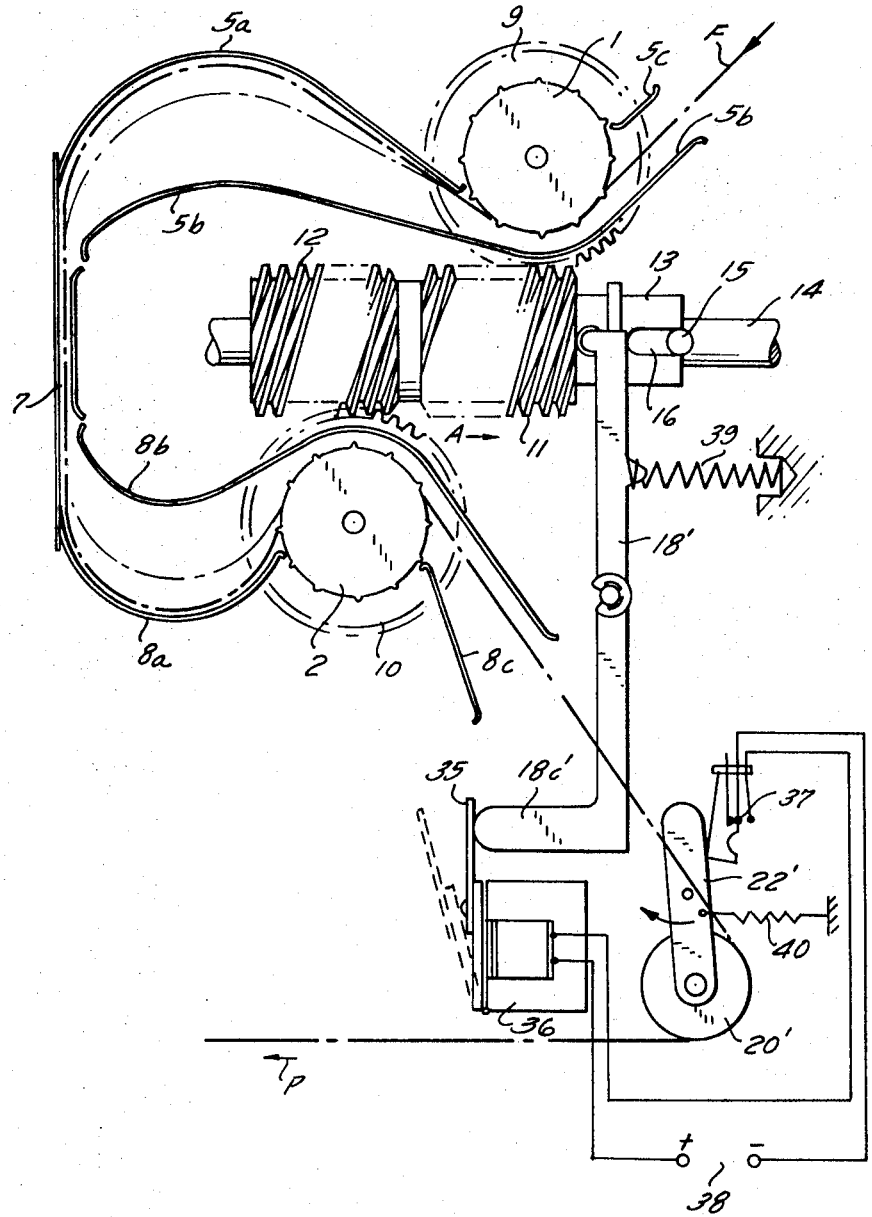
FIG. 2 is similar view of a fully automatic film threading and loop forming means.

FIG. 2 illustrates a portion of a fully automatic projector wherein the film transporting drums 1 and 2 can be rotated by the main drive shaft 14 during threading and during projection of images, and wherein the shaft 13 for the worms 11, 12 is moved axially (arrow A) in response to a change in the condition of an electromagnet 36 whose armature 35 cooperates with an arm 18c' forming part of a modified actuating lever 18'. The deflecting roll 20' is mounted on a two-armed lever 22' the upper arm of which constitutes a trip and can effect opening of a normally closed electric switch 37 in circuit with the electromagnet 36 and with a battery 38 or another suitable source of electrical energy.

When the leading end of the film F is advanced beyond the deflecting roll 20' (in the same way as described in connection with FIG. 1) and is engaged by the teeth of the takeup reel (not shown), the rapidly revolving takeup reel subjects the foremost part of the film to tensional stresses acting in the direction indicated by arrow P whereby the film pivots the lever 22' in a clockwise direction and causes the lever 22' to open the switch 37 so that the electromagnet 36 is deenergized and the armature 35 is free to move to the broken-line position of FIG. 2. This enables a spring 39 to pivot the actuating lever 18' in a clockwise direction whereby the lever 18' shifts the shaft 13 in the direction indicated by arrow A and causes the drums 1 and 2 to move the looped portions of the film F away from the concave inner sides of the fixed loop formers 5a and 8a in the same way as described in connection with FIG. 1. The extent of axial movement of the shaft 13 relative to the main drive shaft 14 is limited by the length of the slot 16.

When the trailing end of the film F is advanced beyond the drum 2, tension acting in the direction indicated by arrow P is reduced to zero so that the lever 22' can pivot in a counterclockwise direction under the action of a helical return spring 40 which causes the upper arm of the lever 22' to permit closing of the switch 37 and to thus energize the electromagnet 36 which returns the armature 35 to the solid-line position of FIG. 2. The armature 35 pivots the lever 18' in a counterclockwise direction so that the spring 39 stores energy and the worms 11, 12 return to the illustrated positions. The projector is then ready to start a fresh automatic film threading operation as soon as the motor which drives the shaft 14 is started and as soon as the operator introduces the leading end of a fresh film into the channel between the guides 5b, 5c so that the leading end moves into the range of teeth on the drum 1.

Figure 3:
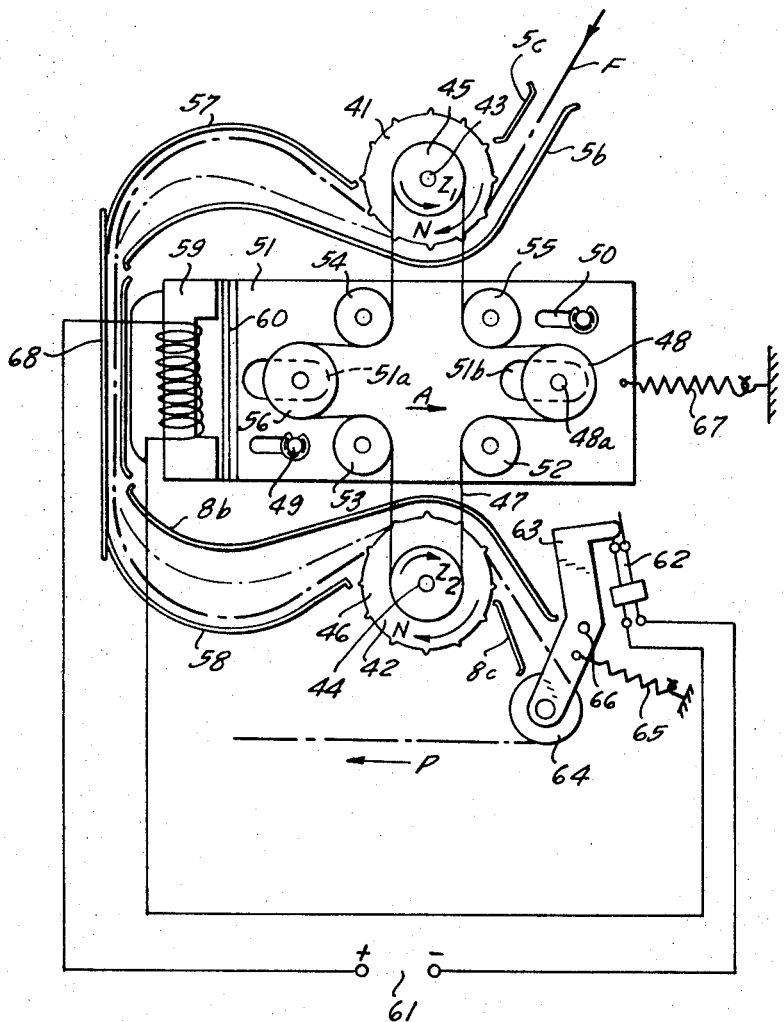
FIG. 3 is a similar view of a second automatic film threading and loop forming means.

Referring finally to FIG. 3, there is illustrated a portion of a further automatic projector wherein the lever 18 or 18' is replaced by a reciprocable actuating means here shown as a carriage 51 and wherein the film transporting drums 41, 42 can receive angular motion in directions indicated by arrows Z1 and Z2 through the intermediary of a belt 47 or an analogous endless flexible element. The drums 41, 42 are mounted on shafts 43, 44 which are fixedly mounted in the housing of the projector. These drums respectively comprise pulleys or sheaves 45, 46. The belt 47 is trained over the pulleys 45, 46 and over four additional pulleys 52, 53, 54, 55 rotatably mounted on the carriage 51. The latter has parallel slots 50 for fixed guide pins 49 and is biased in a direction to the right by a helical spring 67. The left-hand end of the carriage 51 supports the armature 60 of a fixed electromagnet 59. The film gate is shown at 68, the two loop formers at 57, 58, the deflecting roll at 64, and the lever of the deflecting roll at 63. This lever is pivotable on a fixed pin 66 and is biased in a counterclockwise direction by a helical return spring 65. The winding of the electromagnet 59 is in circuit with an energy source 61 and with a normally closed switch 62 which opens to deenergize the electromagnet when the tension of film F (acting in the direction indicated by arrow P) causes the deflecting roll 64 to pivot in a clockwise direction. The arrow A indicates the direction in which the carriage 51 is moved by spring 67 from the illustrated first position to a second position in response to deenergization of the electromagnet 59. The belt 47 is driven by a pulley 48 which is fixed to the main drive shaft 48a of the projector. Still further, the belt 47 is trained over a pulley 56. The shafts of the pulleys 48, 56 are received in elongated slots 51b, 51a of the carriage 51. In order to avoid slippage of the belt 47, the latter is preferably provided with teeth or like projections or serrations which enter complementary recesses or grooves in peripheral surfaces of the pulleys 45, 46, 48, 52, 53, 54, 55 and 56. The main shaft 48a drives the belt 47 in such direction that the drums 41, 42 rotate in directions indicated by arrows N. Those portions of the belt 47 which are tangential to the pulleys 45, 46 extend at right angles to the direction of reciprocatory movement of the carriage 51 when the latter assumes the first position shown in FIG. 3.

When the leading end of the film F is introduced into the channel between the guides 5b and 5c, and when the leading end is engaged by the teeth of the drum 41, the film is caused to move along the inner side of the loop former 57, through the gate 68, along the inner side of the loop former 58, into the range of teeth on the drum 42, through the channel defined by the guides 8b, 8c, around the deflecting roll 64 and on to the core of the takeup reel, not shown. The takeup reel produces tension which acts in the direction indicated by arrow P. Prior to generation of such tension, the switch 62 is closed because the spring 65 maintains the lever 63 in the illustrated position so that the electromagnet 59 is energized and attracts its armature 60 to hold the carriage 51 in the first position shown in FIG. 3. As soon as the tension acting in the direction indicated by arrow P suffices to pivot the lever 63 against the opposition of the spring 65, the upper arm of the lever 63 opens the switch 62 which is in series with the winding of the electromagnet 59. Thus, the electromagnet 59 is deenergized and releases the armature 60 so that the spring 67 contracts and moves the carriage 51 to the second position (arrow A) whereby the carriage slides along the pins 49. The length of slots 50 determines the extent of rightward movement of the carriage 51. The carriage entrains the pulleys 52—55 whereby the portions of the belt 47 which are tangential to the pulleys 45, 46 make an obtuse angle with the direction of reciprocatory movement of the carriage. Thus, the locus of engagement between the belt 47 and the pulleys 45, 46 is shifted whereby the pulleys 45, 46 are respectively turned in directions indicated by arrows Z1, Z2 and cause the drums 41, 42 to move the loops of motion picture film F away from the concave inner sides of the loop formers 57, 58 for reasons which were explained in connection with FIG. 1. It will be noted that a rightward movement of the carriage 51 produces a counterclockwise angular displacement of the drum 41 and that such rightward movement of the carriage brings about a clockwise angular displacement of the drum 42.

The carriage 51 remains in the second position while the major part of the film F advances past the gate 68. When the trailing end of the film moves beyond the drum 42, tension acting in the direction indicated by arrow P is reduced to zero so that the spring 65 contracts and returns the lever 63 and the deflecting roll 64 to the positions shown in FIG. 3. The switch 62 closes automatically so that the electromagnet 59 is energized attracts the armature 60 to thereby return the carriage 51 illustrated position. The spring 67 stores energy and the projector is ready to carry out a fresh automatic threading operation. The belt 47 is returned to the illustrated position in which its upper and lower portions extend tangentially of the pulleys 45, 46 and at right angles to the direction indicated by arrow A.

It is clear that the pulleys shown in FIG. 3 can be replaced by gears; the belt 47 is then replaced by an endless chain. In the appended claims, the term pulley or pulleys is intended to embrace gears.

Without further analysis, the foregoing will so fully reveal the gist of the present invention that others can, by applying current knowledge, readily adapt it for various applications without omitting features which fairly constitute essential characteristics of the generic and specific aspects of my contribution to the art.

What is claimed as new and desired to be protected by Letters Patent is set forth in the appended claims.

I claim:

1. In a motion picture projector, a combination comprising guide means defining an elongated path for motion picture film and including a gate and first and second loop formers respectively located upstream and downstream of said gate; first and second film transporting members respectively located upstream and downstream of said first and second loop formers to transport the film along said path; drive means arranged to engage first portions of and to thereby rotate said transporting members during a first stage of film transport and to engage second portions of said transporting members during a second stage of film transport whereby said transporting members receive motion which is superimposed upon motion received during said first stage and is effective to shorten the loops formed by said loop formers, each of said transporting members comprising a worm wheel and said drive means comprising a pair of worms each meshing with one of said worm wheels; and means for moving said worms axially with reference to said worm wheels to thereby move said worms from engagement with first into engagement with second portions of the respective worm wheels.

2. A combination as defined in claim 1, further comprising driven takeup means arranged to engage the leading end of and to tension the film after the leading end advances along and beyond said path, and means for terminating said first stage in response to tensioning of film by said takeup means.

3. A combination as defined in claim 2, wherein the means for terminating said first stage comprises electromagnet means responsive to changes in tension of the film to thereby actuate said means for moving said worms.

4. A combination as defined in claim 1, wherein one of said worms has left-hand threads and the other of said worms has right-hand threads so that said transporting members rotate in opposite directions in response to simultaneous axial displacement of said worms.

5. A combination as defined in claim 4, wherein said worms have a common axis of rotation, same means for moving said worms axially comprising a driven shaft rigid with said worms and means for reciprocating said shaft.

6. A combination as defined in claim 5, wherein said worms are integral with said shaft.

7. A combination as defined in claim 6, wherein said shaft and said worms consist of impact-resistant synthetic plastic material.

8. A combination as defined in claim 5, further comprising a main drive shaft for rotating said first mentioned shaft in each axial position thereof.

9. A combination as defined in claim 1, wherein the means for moving said worms axially comprises an actuating member and a portion of said guide means.

10. A combination as defined in claim 9, further comprising a driven takeup member located downstream of said guide means arranged to engage and to entrain the leading end of film after such leading end advances along and beyond said path whereby the film is subjected to tension, said portion of said guide means comprising a movable member which is responsive to such tension to thereby effect axial movement of said worms by way of said actuating member.

11. A combination as defined in claim 10, wherein said movable member comprises a roll and wherein the film is trained around said roll in response to movement along said path.

12. A combination as defined in claim 11, wherein said actuating member comprises a two-armed lever one arm of which is operatively connected with said worms and further comprising a second lever pivotable about a predetermined axis and supporting said roll, said second lever being arranged to pivot in response to tensioning of film by said takeup means to thereby move said first mentioned lever from a first position to a second position and to thus move said worms axially.

13. A combination as defined in claim 12, further comprising detent means for biasing said second lever to either one of two positions respectively corresponding to first and second positions of said first mentioned lever.

14. A combination as defined in claim 12, further comprising means for moving said first mentioned lever from second to first position.

15. A combination as defined in claim 14, wherein the means for moving said first mentioned lever from second to first position comprises electromagnet means.

16. A combination as defined in claim 14, wherein the means for moving said first mentioned lever from second to first position comprises manually operated selector means.

17. A combination as defined in claim 16, wherein said drive means further comprises a prime mover and wherein said selector means is arranged to start or arrest said prime mover.

18. In a motion picture projector, a combination comprising guide means defining an elongated path for motion picture film and including a gate and first and second loop formers respectively located upstream an downstream of said gate; first and second film transporting members respectively located upstream and downstream of said first and second loop formers to transport the film along said path; drive means arranged to engage first portions of and to thereby rotate said transporting members during a first stage of film transport and to engage second portions of said transporting members during a second stage of film transport whereby said transporting members receive motion which is superimposed upon motion received during said first stage and is effective to shorten the loops formed by said loop formers, each of said transporting members comprising a pulley and said drive means comprising an endless flexible element trained over said pulleys; and means for moving said endless flexible element between first and second positions in which said element respectively engages first and second portions of said pulleys.

19. A combination as defined in claim 18, wherein said drive means further comprises a main drive member for said flexible element and wherein said means for moving said flexible element between first and second positions comprises actuating means including additional pulleys, said flexible element being trained around said additional pulleys and said actuating means being movable between first and second positions respectively corresponding to first and second positions of said flexible element.

20. A combination as defined in claim 19, wherein said main drive member includes a shaft rotatable about a fixed axis.

21. A combination as defined in claim 19, wherein said actuating means is reciprocable between said positions thereof and wherein such reciprocation of said actuating means effects a change in the position of those portions of said flexible element which engage the pulleys of said transporting members.

22. A combination as defined in claim 21, wherein said actuating means comprises a carriage which is reciprocable at right angles to the axes of said transporting members.

23. A combination as defined in claim 19, further comprising rotary takeup means arranged to engage the leading end of and to tension the film after the leading end advances along and beyond said path, and means for effecting movement of said actuating means from first to second position in response to tensioning of the film.

24. A combination as defined in claim 23, wherein the means for effecting movement of said actuating means from first to second position comprises a roll forming part of said guide means.

25. A combination as defined in claim 23, further comprising electromagnet means energizable to hold said actuating means in first position and means for biasing said actuating means to second position, said means for effecting movement of said actuating means comprising means for deenergizing said electromagnet means in response to tensioning of film by said takeup means.